US010902796B1

(12) United States Patent
Kingman et al.

(10) Patent No.: US 10,902,796 B1
(45) Date of Patent: Jan. 26, 2021

(54) MULTI-USER DISPLAY SYSTEM (71) Applicant: Apple Inc., Cupertino, CA (US)

(72) Inventors: David E. Kingman, Campbell, CA (US); Clarisse Mazuir, San Jose, CA (US); James R. Wilson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 15/651,820

(22) Filed: Jul. 17, 2017

Related U.S. Application Data (60) Provisional application No. 62/393,508, filed on Sep. 12, 2016.

(51) Int. Cl.
G09G 3/34 (2006.01)
G02B 27/01 (2006.01)
G06F 3/14 (2006.01)
G09G 3/36 (2006.01)
G09G 3/20 (2006.01)
H04R 1/02 (2006.01)

(52) U.S. Cl.
CPC ....... *G09G 3/3406* (2013.01); *G02B 27/0101* (2013.01); *G02B 27/0172* (2013.01); *G06F 3/1423* (2013.01); *G09G 3/2092* (2013.01); *G09G 3/36* (2013.01); *H04R 1/028* (2013.01); G02B 2027/0178 (2013.01); G09G 2300/0413 (2013.01); G09G 2310/08 (2013.01); G09G 2320/0646 (2013.01); G09G 2354/00 (2013.01); G09G 2358/00 (2013.01); G09G 2380/10 (2013.01); H04R 2420/07 (2013.01); H04R 2499/13 (2013.01)

(58) Field of Classification Search
CPC ...... G09G 3/36; G09G 3/2092; G09G 3/3406; G02F 27/0101; G02B 27/0172; G06F 3/1423
USPC ............................................ 345/87, 690, 691
See application file for complete search history.

(56) References Cited

U.S. PATENT DOCUMENTS

| 6,819,464 | B2 * | 11/2004 | Fujimori | H04N 9/3144 |
| | | | | 348/E9.027 |
| 8,537,207 | B2 | 9/2013 | Shih et al. | |
| 8,566,694 | B2 | 10/2013 | Proux et al. | |
| 9,036,847 | B2 | 5/2015 | Han et al. | |
| 9,916,691 | B2 * | 3/2018 | Takano | A61B 6/461 |
| 9,971,235 | B2 * | 5/2018 | Miyasaka | G03B 21/005 |

(Continued)

*Primary Examiner* — Calvin C Ma
(74) *Attorney, Agent, or Firm* — Treyz Law Group, P.C.; G. Victor Treyz; Kendall W. Abbasi (57) ABSTRACT Electronic equipment in a system such as a vehicle or building may include one or more displays. The displays may display image frames for users with light-modulating glasses. The image frames may include interspersed image frames corresponding to unique content for each of the users. Dummy frames may be incorporated into the displayed frames on the display to help obscure displayed content from external observers. The light-modulating glasses may have light modulators such as liquid crystal light modulators. Control circuitry in the glasses may adjust the light modulators to exhibit transparent intervals that overlaps desired image frames and opaque intervals that are aligned with other image frames and the dummy frames. This allows each user to view unique content on a shared display while preventing external observers without glasses from observing the content that is being presented.

20 Claims, 10 Drawing Sheets (56) References Cited

U.S. PATENT DOCUMENTS

| | | | |
|---|---|---|---|
| 2006/0230428 A1 | 10/2006 | Craig et al. | |
| 2011/0298803 A1* | 12/2011 | King | H04N 13/332 345/427 |
| 2012/0190439 A1* | 7/2012 | Nourbakhsh | G02B 27/2264 463/31 |
| 2014/0078271 A1* | 3/2014 | Oda | H04N 9/3111 348/56 |
| 2014/0307067 A1 | 10/2014 | Douglas et al. | |
| 2015/0221247 A1* | 8/2015 | Herger | G02B 27/017 345/8 |
| 2015/0264256 A1* | 9/2015 | Lehtiniemi | H04N 5/23229 348/143 |

* cited by examiner

| |
|---|
| V1 |
| V2 |
| V1 |
| V2 |
| V1 |
| V2 |
| V1 |
| V2 |
| V1 |
| V2 |

MULTI-USER DISPLAY SYSTEM

This application claims the benefit of provisional patent application No. 62/393,508, filed on Sep. 12, 2016, which is hereby incorporated by reference herein in its entirety.

FIELD

This relates generally to systems with displays, and, more particularly, to systems with displays shared by multiple users.

BACKGROUND

Vehicles and other systems may sometimes include displays. It can be desirable for multiple users to share a display. For example, it may be desirable for multiple vehicle occupants to be able to view individualized content on an in-vehicle display.

It can be challenging to incorporate display systems for multiple users into a vehicle, building, or other system. If care is not taken, viewers may not be able to view desired content and privacy concerns may not be addressed.

SUMMARY

Electronic equipment in a system such as a vehicle or building may include one or more displays. The displays may display image frames for users with light-modulating glasses.

The image frames that are displayed on a display may include interspersed image frames corresponding to unique content for each of multiple users. Dummy frames may be interspersed among the image frames to help obscure user content from external observers.

The light-modulating glasses may have light modulators such as liquid crystal light modulators. Wireless circuitry in the light-modulating glasses may be used to synchronize the light modulators to the image frames. Control circuitry in the glasses may adjust the light modulators to exhibit transparent intervals that overlaps desired image frames and opaque intervals that are aligned with other image frames and the dummy frames. This allows each user to view unique content on a shared display while preventing external observers without glasses from observing the content that is being presented.

DETAILED DESCRIPTION

Figure 1:
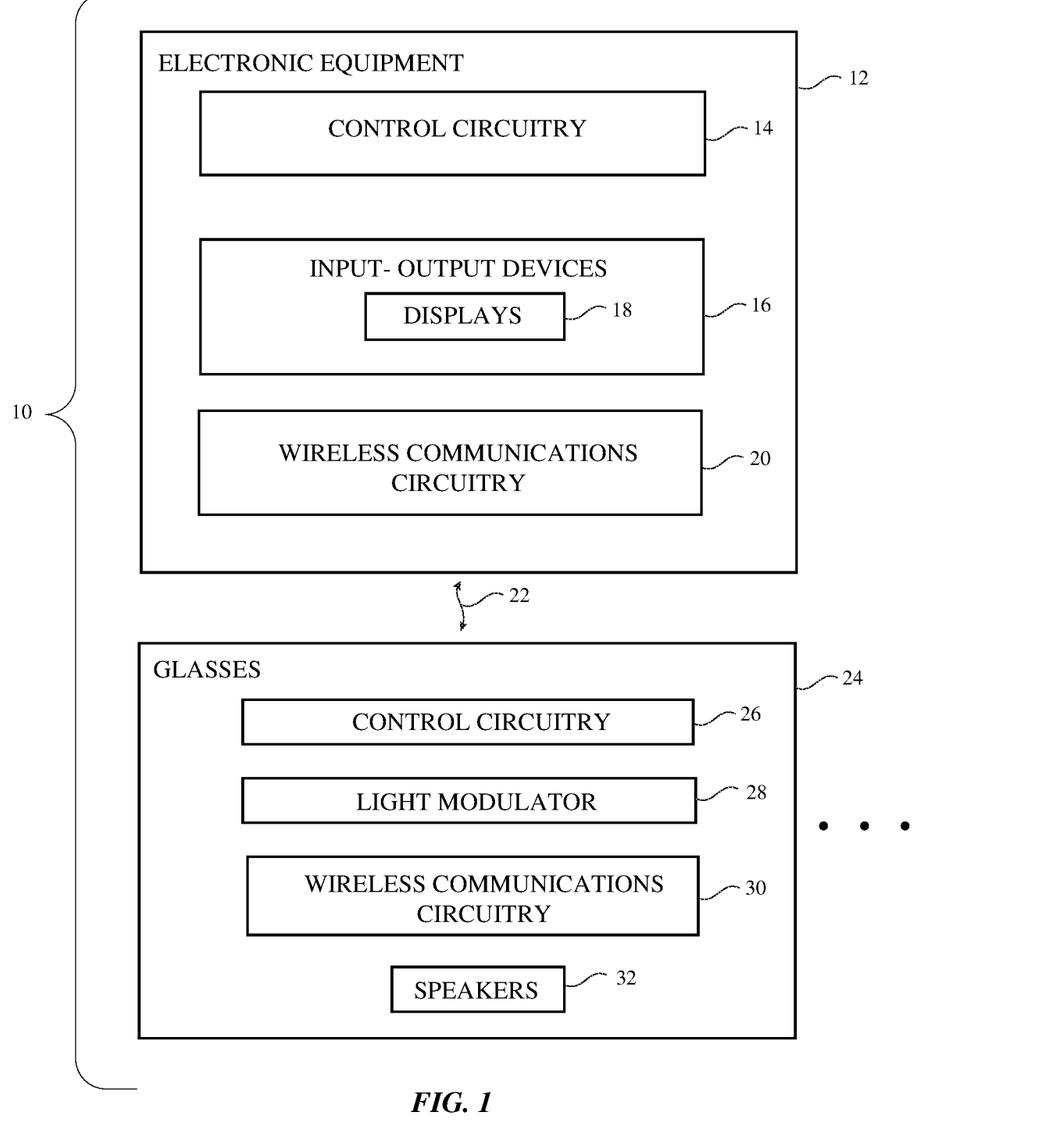
FIG. 1 is a schematic diagram of an illustrative system in accordance with an embodiment.

FIG. 1 is a diagram of an illustrative system of the type that may be used to allow multiple viewers to view individualized content on one or more shared displays. System 10 of FIG. 1 may be a vehicle system, a building system (e.g., a home or office), or other system. Configurations in which individualized display content is presented to viewers in vehicles, offices, and other environments with one or more displays and in which viewers have light-modulating glasses may sometimes be described herein as examples. In general, any suitable equipment may be used to present users with individualized content.

As shown in FIG. 1, system 10 may include electronic equipment with displays such as electronic equipment 12. Equipment 12 may include control circuitry 14. Control circuitry 14 may include storage and processing circuitry for supporting the operation of system 10. The storage and processing circuitry may include storage such as hard disk drive storage, nonvolatile memory (e.g., electrically-programmable-read-only memory configured to form a solid state drive), volatile memory (e.g., static or dynamic random-access-memory), etc. Control circuitry 14 may also include processing circuitry based on one or more microprocessors, microcontrollers, digital signal processors, baseband processors, power management units, audio chips, application specific integrated circuits, etc.

The processing circuitry in control circuitry 14 may be used to control the operation of equipment 12 and other components in system 10. For example, control circuitry 14 may be used to control vehicle controls (steering, brakes, propulsion, etc.) and other components in a vehicle or may be used to control environmental systems (heating, air conditioning, lighting, etc.) in a building. The processing circuitry in control circuitry 14 may also be used to gather input from input-output devices 16, may use wireless communications circuitry 20 to communicate with external devices over wireless paths such as path 22, and may control the operation of displays 18 and other input-output devices to provide users of equipment 12 with output. Input-output devices 16 may include sensors, buttons, keyboards, and other input-output devices that allow users to control equipment 12.

System 10 may include one or more pairs of glasses 24. Glasses 24 may contain control circuitry 26 (e.g., control circuit hardware of the type included in control circuitry 14 and/or other control circuitry). Circuitry 26 may use wireless communications circuitry 30 to communicate with wireless equipment such as equipment 12 over wireless links (see, e.g., path 22). If desired, circuitry 14 and circuitry 26 may communicate using wired paths in addition to or instead of using wireless communications. Wireless communications circuitry 20 and 30 may support Bluetooth® communications, other short-range wireless communications (e.g., IEEE 802.11 wireless local area network communications), cellular telephone communications, near-field communications, etc.

Control circuitry 14 may present media to multiple users with light-modulating glasses 24. Each pair of glasses 24 in system 10 may have a light modulator 28 that is synchronized to a different portion of the content being displayed by displays 18. For example, control circuitry 14 may display content for a first user during odd image frames and for a second user during even image frames. Control circuitry 26 in glasses 24 for the first user may be transparent during the odd frames and opaque during the even frames, so that the first user views only the content of the odd frames, whereas control circuitry 26 in glasses 24 for the second user may be opaque during the odd frames and transparent during the even frames, so that the second user views only the content of the even frames. Configurations with other types of content multiplexing may also be used, if desired.

Each pair of glasses 24 may have a set of speakers 32 for presenting individualized audio content to the user of that pair of glasses. Audio content may be provided to each user's wireless communications circuitry 30 by wireless communications circuitry 20 in equipment 12 using a separate respective wireless channel (as an example).

Figure 2:
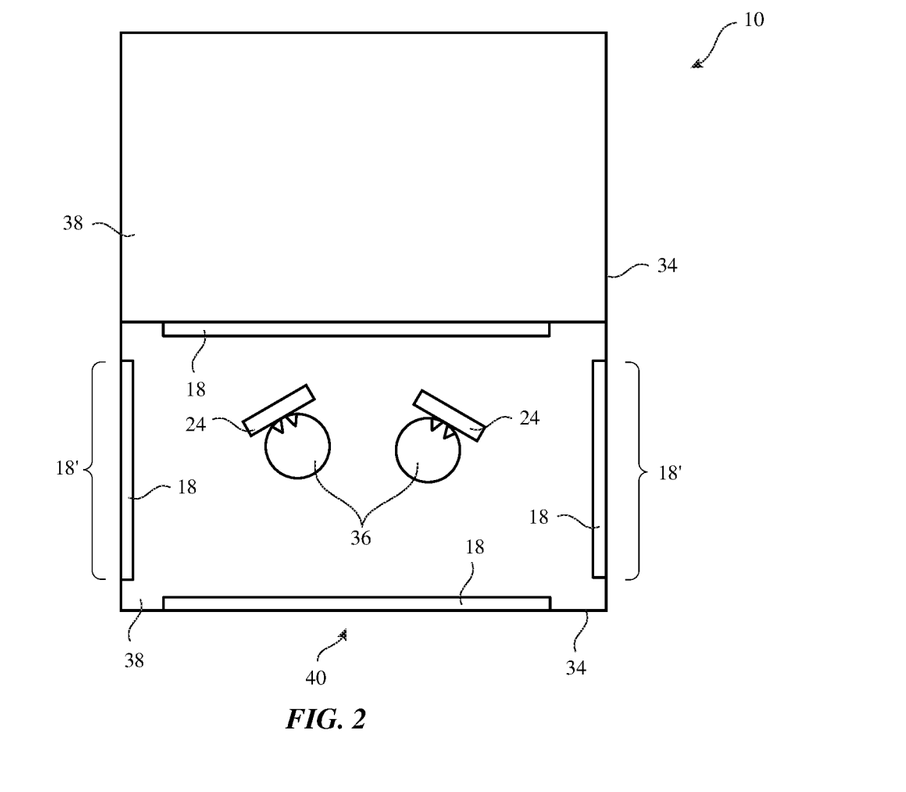
FIG. 2 is a diagram of a system such as a vehicle with displays in accordance with an embodiment.

FIG. 2 is a top view of structures of the type that may be associated with system 10 in an operating environment such as a vehicle or office. As shown in FIG. 2, users 36 may each have a pair of glasses 24. One or more displays 18 may be mounted in locations in which the displays can be viewed by users 36 through their glasses 24. In the example of FIG. 2, system 10 is a vehicle or building having structures 34. In a vehicle, structures 34 may include portions of a vehicle body (e.g., door panels, a roof, etc.). In an office, structures 34 may include interior and exterior building walls. Structures 34 may divide interior and exterior spaces from each other. As shown in FIG. 2, for example, structures 34 may separate interior regions 38 (e.g., a vehicle interior or an interior room in a building) from each other and from exterior 40 (e.g., the outside of a vehicle, the outside of a building, etc.).

Displays 18 may be mounted on opaque portions of structures 34 (e.g., opaque body panels in a vehicle, opaque walls in a building) or other portions of system 10. If desired, displays 18 may be transparent displays that are mounted over windows 18' in system 10 (e.g., displays that are integrated into transparent vehicle windows or that overlap transparent interior and/or exterior building windows). Windows with displays 18 may be formed from one or more laminated layers of glass and/or plastic or other window substrate materials. Displays 18 may be touch screen displays or may be insensitive to touch.

Displays 18 may include pixel arrays formed from rows and columns of pixels that display images. The images may be displayed in a series of image frames. Display 18 may be liquid crystal displays, organic light-emitting diode displays, displays based on arrays of light-emitting diode dies, electrophoretic displays, projector displays, or other displays. If desired, displays 18 may cover some or all of interior 38 (e.g., displays 18 may surround interior 38 and may be placed on all four sides of users 36 to surround users 36 and provide users 36 with an immersive visual environment). The content (image frames) displayed on displays 18 may include moving images (video) and/or still images (e.g., static text). Content may be captured using image sensors, may be generated by a computer (e.g., video-game content), and/or may be generated by other suitable sources in equipment 12 (e.g., by control circuitry 14).

Figure 3:
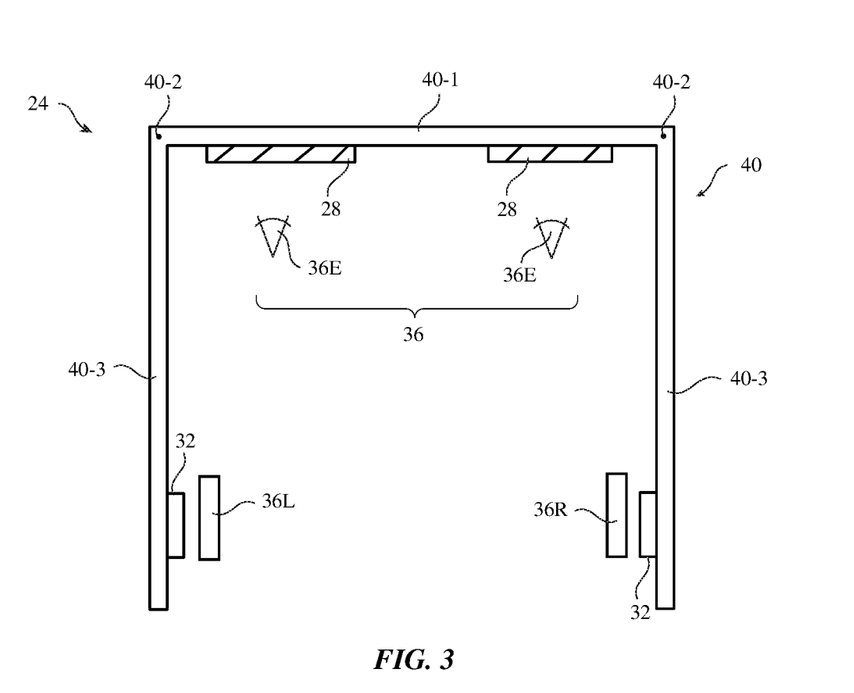
FIG. 3 is a diagram of an illustrative pair of glasses for a viewer in a system of the type shown in FIG. 2 in accordance with an embodiment.

Each user (vehicle occupant, room occupant, etc.) in system 10 may have a respective pair of glasses 24. For example, if there are three users in system 10, each of the three users may be provided with a respective pair of glasses 24. A top view of an illustrative pair of glasses 24 is shown in FIG. 3. As shown in FIG. 3, glasses 24 may have support structures such as frame 40. Frame 40 may have right and left temples 40-3 that are coupled to chassis 40-1 by hinges 40-2. Speakers 32 may be mounted on temples 40-3 in alignment with a user's left and right ears 36L and 36R, respectively. Light modulators 28 may be mounted on chassis 40-1. Light modulators 28 may include a left-eye light modulator aligned with a left eye 36E of user 36 and a right-eye light modulator aligned with a right eye 36E of user 36. During operation, light modulators 28 may be dynamically placed in a transparent state or an opaque state. In the transparent state, user 36 may view displays 18 and nearby objects through light modulators 28. In an opaque state, light modulators 28 are opaque and prevent light from reaching user 36.

Light modulators 28 may alternate between the transparent and opaque states so undesired content on displays 18 can be filtered out and so that desired content on displays 18 may be viewed by user 36. Light modulators 28 may be based on components that are electrically adjustable between transparent and non-transparent (e.g., opaque or diffuse) states. Light modulators 28 may, for example, be liquid crystal light modulators (sometimes referred to as liquid crystal shutters) that can be switched between transparent and opaque states or may be polymer dispersed liquid crystal light modulators that can transition between transparent and translucent states. Liquid crystal shutters may be based on guest-host liquid crystal light modulators that can transition between transparent and light-blocking states or may be based on non-guest-host liquid crystal light modulators (e.g., liquid crystal light modulators with polarizers). Cholesteric liquid crystal light modulators may also be used. If desired, other light modulators may be used in addition to or instead of liquid crystal light modulators.

In addition to or instead of using time-division light modulation techniques to allow users to share a display, glasses 24 may be provided with optical modulators that filter out different colors and/or polarizations of light to allow users to share a display. If desired, glasses 24 may combine time-based multiplexing, wavelength-based multiplexing, and/or polarization-based multiplexing techniques (e.g., to alternately pass red or green light, to alternately pass horizontally polarized light or vertically polarized light, etc.). Optical modulators such as spatial light modulators can also be provided to block out different portions of a scene at different times.

In the example of FIG. 3, glasses 24 are configured to be worn on the head of a user so that light modulators 28 are aligned with eyes 36E. If desired, light modulators 28 and speakers 32 may be aligned respectively with eyes 36E and ears 36L and 36R using other arrangements. For example, light modulators 28 and speakers 32 may be mounted in a helmet or other equipment associated with a heads up display. Glasses 24, which may sometimes be referred to as head-mounted glasses, a wearable light modulator device, or a head-mounted device, may have two light modulators 28 or may have a single light modulator that extends over left eye 36L and right eye 36R.

Figure 4:
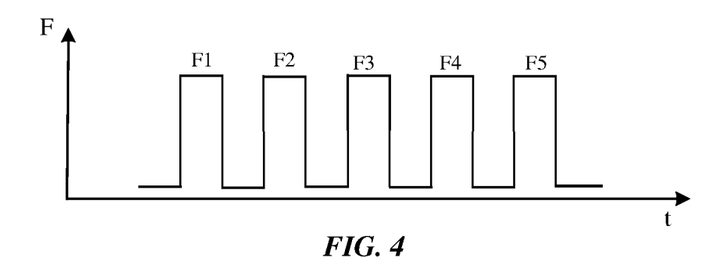
FIGS. 4, 5, 6, and 7 are timing diagrams showing how multiple users may be provided with individualized content using interspersed image frames on a shared display in accordance with an embodiment.

FIGS. 4, 5, 6, and 7 show how system 10 may be used to provide each of multiple users 36 in system 10 with individualized content. As shown in FIG. 4, a graphics processing unit or other video source in control circuitry 14 may output a series of image frames F1, F2, F3, F4, F5, etc. that are displayed sequentially on one or more of displays 18. Each image frame may contain potentially unique information (e.g., the pattern of red, blue, and green pixels of each frame may be different). For example, in configurations in which image frames F correspond to frames in a movie, each frame may contain a different portion of the movie. Frames F may be presented at any suitable frame rate (e.g., 60 Hz, 120 Hz, 240 Hz, 100-600 Hz, more than 50 Hz, less than 1000 Hz, etc.). In some arrangements, portions of frames F may correspond to static or nearly static content. For example, displays 18 may be used to present still images or static or slowly moving text.

Figure 5:
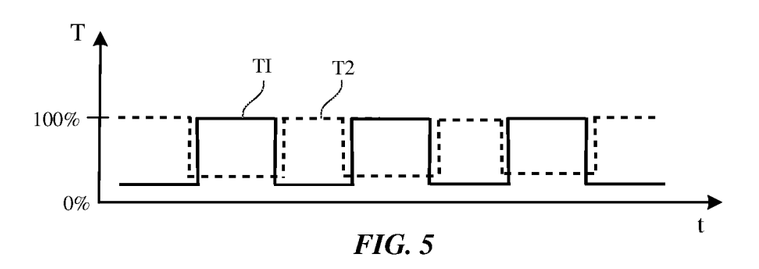

Equipment 12 and glasses 24 may be synchronized by using a common clock and/or by wirelessly exchanging synchronization information using wireless communications circuitry 20 and 30. Once synchronized, the transmission T of the light modulators may be operated in synchronization with frames F of image data provided by equipment 12 on displays 18. For example, a first pair of glasses 24 may have light modulators that are modulated to produce light transmission curve T1 for a first user and a second pair of glasses 24 may have light modulators that are modulated to produce light transmission curve T2 for a second user, as shown in FIG. 5.

The light modulation patterns associated with curves T1 and T2 each include transparent time intervals in which T is high (e.g., 100% or other elevated amount) and opaque time intervals in which T is low (e.g., 0% or other lowered amount). The light modulation patterns allow the first and second users to view different subsets of image frames F and therefore different content on displays(s) 18. Because transmission curve T1 has transparent intervals that overlap odd frames F1, F3, F5, . . . and has opaque intervals that overlap even frames F2, F4, . . . , even frame content will be blocked and the first user will view only odd frame content. Transmission curve T2 has transparent intervals that are aligned with even frames and opaque intervals that are aligned with odd frames, so the second user will be presented only with even frame content.

Figure 6:
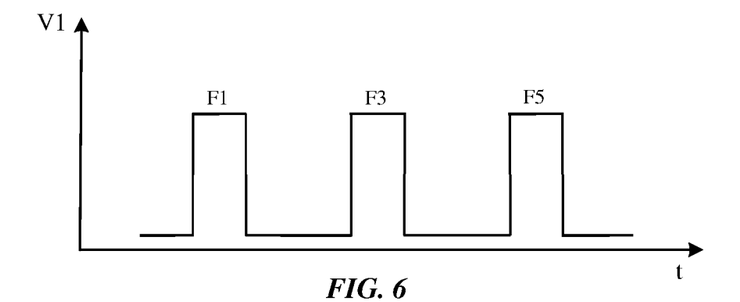
Figure 7:
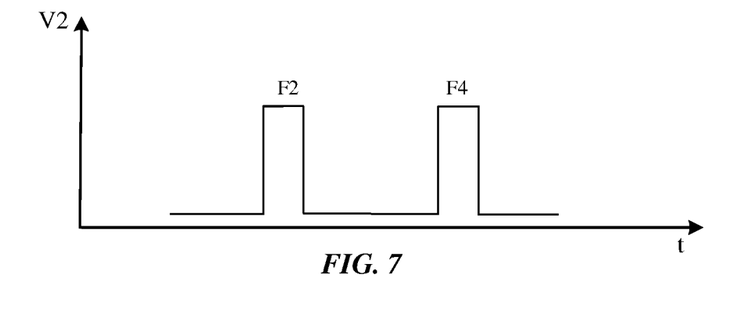

The frame rate of the odd frames and the frame rate of the even frames may each be sufficiently high to provide smooth video playback. This allows equipment 12 to provide a first movie or other video content V1 to the first user as shown in FIG. 6, while simultaneously providing a second movie or other video content V2 to the second user as shown in FIG. 7. To ensure that the first and second users are provided with appropriate audio content in synchronization with their video content, equipment 12 may simultaneously provide an audio track for the first movie to the first user using speakers 32 in the first pair of glasses and an audio track for the second movie to the second user using speakers 32 in the second pair of glasses. The video content that is provided to each user may be computer-generated content such as virtual reality images, may be moving images from a camera, or may be frames of stored video (e.g., for a movie, television show, etc.). If desired, video content may contain static or nearly static text, graphics, etc.

Figure 8:
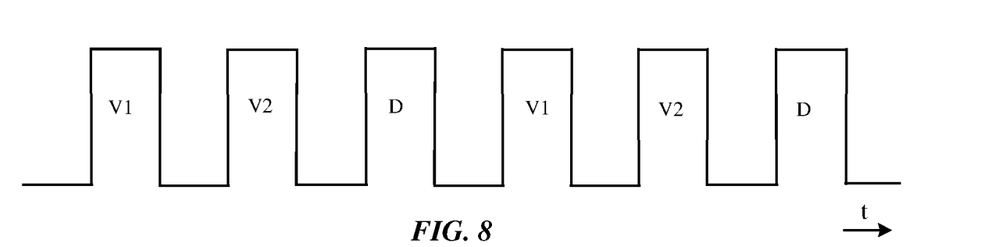
FIGS. 8 and 9 are timing diagrams showing how dummy content may be interspersed with content for viewers with light-modulating glasses in accordance with an embodiment.

To enhance privacy, one or more frames that do not contain content for the first and second users may be interspersed with the image frames for the first and second users. As shown in FIG. 8, for example, a first set of image frames V1 may be used to convey a first video to a first user, a second set of interspersed image frames V2 may be used to convey a second video to a second user, and dummy content D may be interspersed with the first and second image frames. Dummy content D may contain image frames with random patterns or other noise, images that are the inverse (complement) of other frames, video for a movie or other content that is not intended to be watched by any of the users in system 10 and that is not visible through any of glasses 24, or other content that is not viewed by users 36.

Due to the averaging characteristics of human eyes, rapidly changing image content will be smoothed out and will appear as continuous images to an observer. When videos V1 and V2 have uncorrelated content and both contain moving images, this content will be smeared out to an external observer of display 18. The external observer may therefore have difficulty viewing either V1 or V2. However, if one of these streams of video (e.g., video V2) temporarily becomes blank (e.g., during a long dark scene), the other video (e.g., video V1) may become momentarily visible.

The presence of dummy content D may therefore be used to help obscure both videos V1 and V2, even in scenarios in which one of the videos contains long dark passages or other static content that does not significantly interfere with the other video. For example, the presence of dummy content may make it difficult or impossible for outside observers of displays 18 in system 10 (e.g., pedestrians and occupants of vehicles other than a vehicle including system 10, occupants of rooms other than a room of a building in which system 10 is located, or other external observers) to view video content such as video V1 and V2 of FIG. 6 and FIG. 7.

Figure 9:
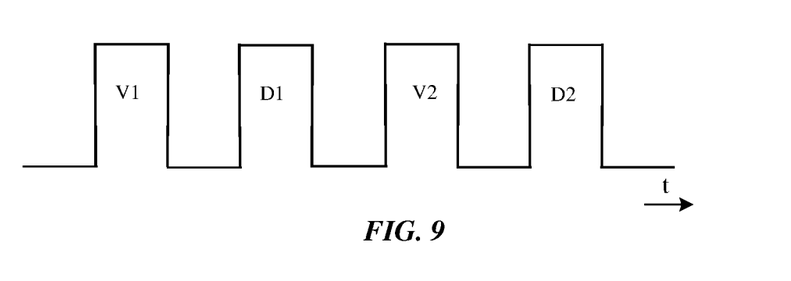

In the example of FIG. 8, video frames for video V1, video frames for video V2, and dummy content D are being repeatedly presented in sequential frames. This is merely illustrative. There may be three or more users in system 10, each of which may have a unique set of glasses 24 that is used to view a respective independent video stream, there may be two or more sets of dummy content frames D, and the dummy frames and/or user image frames may have different time-varying patterns. For example, video frames V1 and video frames V2 may be separated by interposed dummy frames D1 and D2 as shown in FIG. 9.

Figure 10:
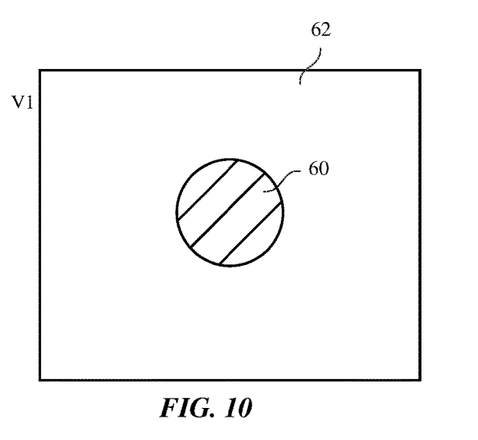
FIGS. 10, 11, 12, and 13 are diagrams showing illustrative image frames and complementary dummy frames that may be displayed on a display in accordance with an embodiment.

If desired, dummy content may be based at least partly on the non-dummy content (user image frames) that is being presented to users 36. This type of arrangement is illustrated in FIGS. 10, 11, 12, and 13. As shown in FIG. 10, video V1 may contain an image of an object such as white object 60 set against a background such as black background 62. To ensure that external observers cannot view video V1 (even if simultaneous video V2 is not present or is dark), dummy video D1 of FIG. 9 may be created. Each dummy frame D1 may be a complementary version of a corresponding one of video frames V1, so that the combined light output viewed by an external observer without glasses will appear white or will have another predetermined private appearance.

In general, displays 18 may display color and/or monochrome content. In the example of FIG. 10, object 60 is a white circle and background 62 is black. To obscure video V1 from external observers, complementary dummy content such as dummy video D1 of FIG. 11 may be displayed on display 18. Dummy video D1 may contain a black circle 66 that is the inverse of the white circle 60 of video V1 and may contain a white background 64 that is the inverse of black background 62. When an external observer (i.e., an observer without glasses 24) views alternating frames of video V1 and dummy video D1, the external observer will perceive that display 18 is filled with static white content. The same technique may simultaneously be used for each unique video stream that is present. For example, if display 18 is displaying video V2 for a second user at the same time that display 18 is displaying video V1 for a first user, control circuitry 14 may direct display 18 to display dummy content D2 of FIG. 13 that is complementary to video content V2 of FIG. 12. Dummy frames D1 and D2 may also be combined, if desired.

Figure 11:
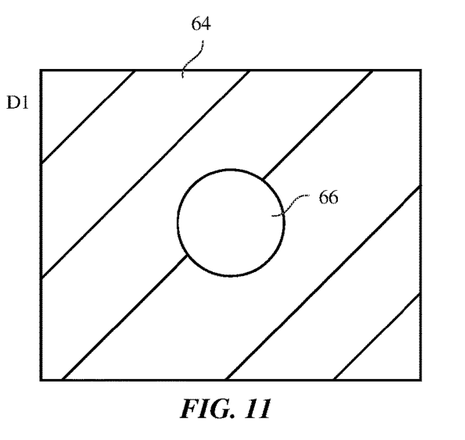
Figure 12:
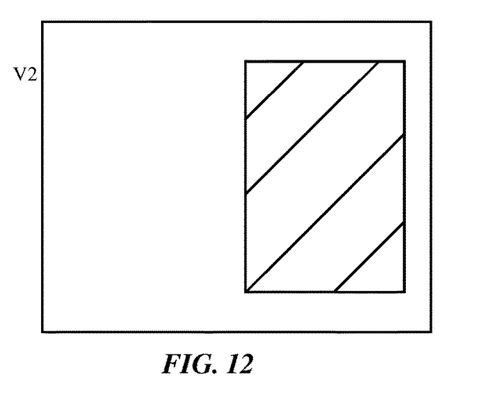
Figure 13:
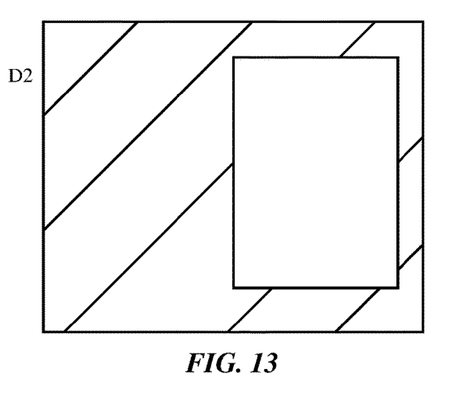

In color displays, dummy content may contain complementary colors. For example, if a pixel in video V1 contains only red and no green or blue, the complementary pixel in dummy content D1 may contain only green and blue and no red. In this way, external observers will observe white content on display 18, even though users in system 10 with glasses 24 will be able to view video V1.

Each user in a multi-user system may independently communicate with control circuitry 14 and may independently select unique content for viewing. For example, users in system 10 may have remote controls, cellular telephones, or other equipment that communicates wirelessly with equipment 12 to make video selections, to change television channels, to adjust playback volume settings, etc. In some situations, users may request identical content (e.g., a first and second user may both wish to view a common television program). By incorporating dummy content D into the displayed image frames on display 18, privacy may be ensured (e.g., external observers will not be able to view the television program).

Figure 14:
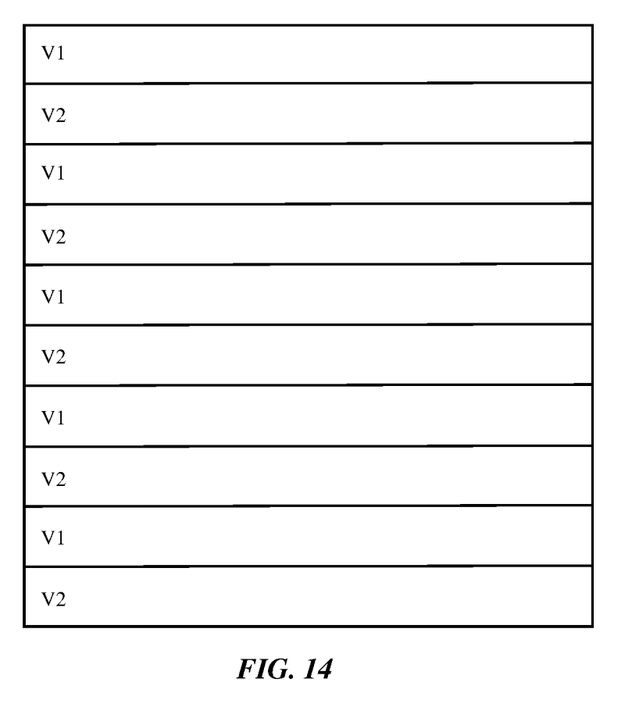
FIG. 14 is a diagram showing how spatial interleaving techniques may be used in presenting individualized content to users in accordance with an embodiment.

In some situations, multiple users may simultaneously view different content on different respective portions of a common display. As shown in FIG. 14, for example, text for a first electronic book or other content may be displayed in a first set of horizontal strips (see, e.g., the odd-numbered horizontal strips of display 18 of FIG. 14, which are filled with first content V1), whereas text for a second electronic book or other content may be displayed on a second sent of horizontal strips (see, e.g., the even-numbered horizontal strips of display 18 of FIG. 14, which are filled with second content V2). In configurations of the type shown in FIG. 14 in which content for different users is placed at different spatial locations on display 18, glasses 24 may include spatial light modulators. The spatial light modulators in glasses 24 for a first user may be adjusted to pass content V1 and block content V2 and the spatial light modulators in glasses 24 for a second user may be adjusted to pass content V2 while blocking content V1. If desired, spatial light modulator schemes (which may be based on liquid crystal spatial light modulators or other suitable spatial light modulators) may be used in conjunction with time division multiplexing schemes such as the schemes of FIGS. 4-9 and/or other multiplexing schemes that allow multiple users to share one or more displays 18. Spatially separated content such as content V1 and V2 may, for example, be directed to different users based on color filtering techniques (wavelength multiplexing), based on polarization multiplexing, or using other multiplexing arrangements.

In schemes of the type shown in FIGS. 4-7, two viewers can share a display by choosing to view either even frames or odd frames, as appropriate. In this type of arrangement, an external observer who has a pair of liquid crystal light modulator glasses or other light modulating glasses may potentially view the even frames or odd frames by adjusting the light modulators in the glasses to exhibit a 50% duty cycle and by synchronizing the glasses to the odd or even frames (e.g., by monitoring light emissions from display 18 to extract a frame rate signal from display 18). To ensure that external observers cannot view potentially personal user content in this way, the pattern in which light modulators 28 darken and lighten (e.g., the pattern of transparent and opaque intervals in transmission curve T) may follow a predetermined code sequence.

Figure 15:
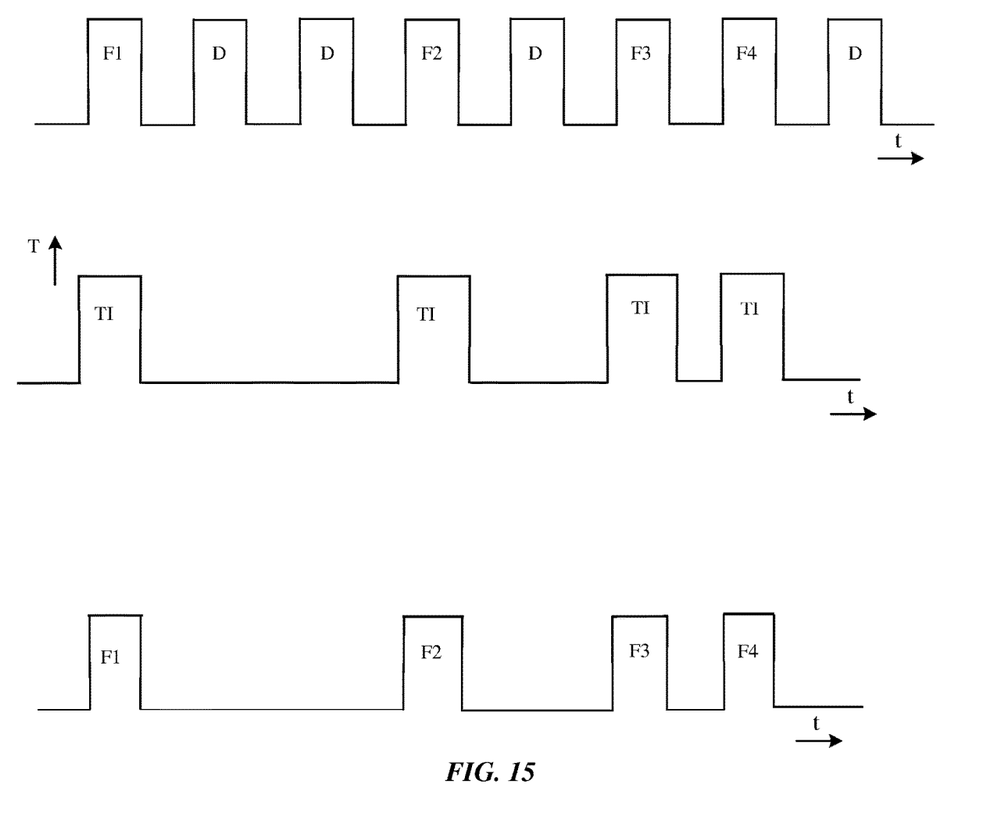
FIG. 15 is a timing diagram showing how frames of content may be displayed with predetermined timing (time-interval) patterns that help ensure viewing privacy in accordance with an embodiment.

This type of arrangement is illustrated in FIG. 15. As shown in the upper trace of FIG. 15, control circuitry 14 may generate a series of image frames F1, F2, F3, F4, etc. corresponding to content to be viewed by a user. Among these frames of content, control circuitry 14 may intersperse dummy frames D to obscure the frames of content from external observers. The user may have a pair of glasses 24 with light modulators 28 that are configured to exhibit transparent intervals TI in a pattern that matches the patterned used for content frames F1, F2, F3, and F4, as shown by transmission curve T (the middle trace of FIG. 15). The patterns of time intervals used for displaying the content frames and the transparent intervals may be, for example, pseudorandom patterns, patterns that change in known progressions (e.g., following a set of code sequences that are known in advance to both equipment 12 and glasses 24 and that periodically repeat), or using other known patterns that are more complex than the repeating on/off patterns of FIGS. 4 and 5. This allows content frames F1, F2, F3, F4, . . . to be passed to the user while dummy frames D are blocked, as illustrated by the lower trace of FIG. 15. To avoid flickering, the frame rate of the image frames may be relatively high (e.g., more than 100 Hz, more than 200 Hz, more than 300 Hz, more than 500 Hz, less than 1000 Hz, etc.). In the example of FIG. 15, only a single user was provided with glasses 24. If desired, different patterns (e.g., non-overlapping patterns) may be used for the playback of image frames for different users (e.g., two or more users, three or more users, four or more users, etc.).

Figure 16:
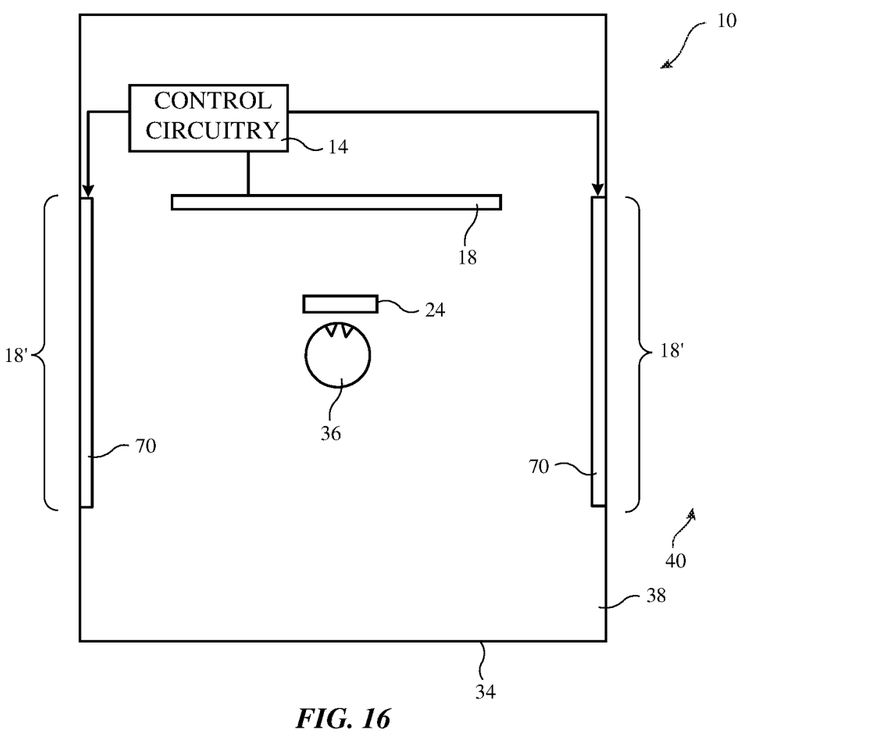
FIG. 16 is a diagram of an illustrative system in which windows have been provided with light modulators in accordance with an embodiment.

As shown in FIG. 16, system 10 may include light modulators 70 that are incorporated into structures such as windows 18' (e.g., interior or exterior windows in a building or vehicle). Light modulators 70 may be liquid crystal light modulators with polarizers, guest-host liquid crystal light modulators, polymer dispersed liquid crystal light modulators, cholesteric liquid crystal light modulators, or other suitable light modulators. During operation, control circuitry 14 may display frames of video for one or more users 36 in system 10 while displaying dummy frames to help obscure the displayed content for external observers. The transmission of glasses 24 may be modulated to allow each user to view a desired portion of the image frames on display 18. The transmission of light modulators 70 may be modulated to block the user video content for one or more of the users. For example, if there is one user 36 in interior 38, light modulators 70 may have opaque intervals that overlap the image frames for that user 36, thereby preventing video content for that user from being observed outside of system 10. If there are two users 36, the opaque intervals of light modulators 70 may overlap the image frames of both users 36, to provide both users with privacy.

If desired, light modulators 70 may exhibit transparent intervals aligned with one of the sets of image frames being displayed on display 18. For example, if a user desires to publically share the content for that user that is being displayed on display 18, control circuitry 14 can direct light modulators 70 to produce transparent intervals that are aligned with the image frames of that user. This allows the user's image frames to pass through windows 18' for observation by external observers. Privacy may be maintained for all users 36 by aligning the transparent intervals of light modulators 70 with dummy frames (e.g., frames of content corresponding to an innocuous video, predetermined patterns, etc. that serve as dummy content for external viewers)

and aligning the opaque intervals of light modulators 70 with non-dummy image frames. This type of scheme is illustrated in FIG. 17.

Figure 17:
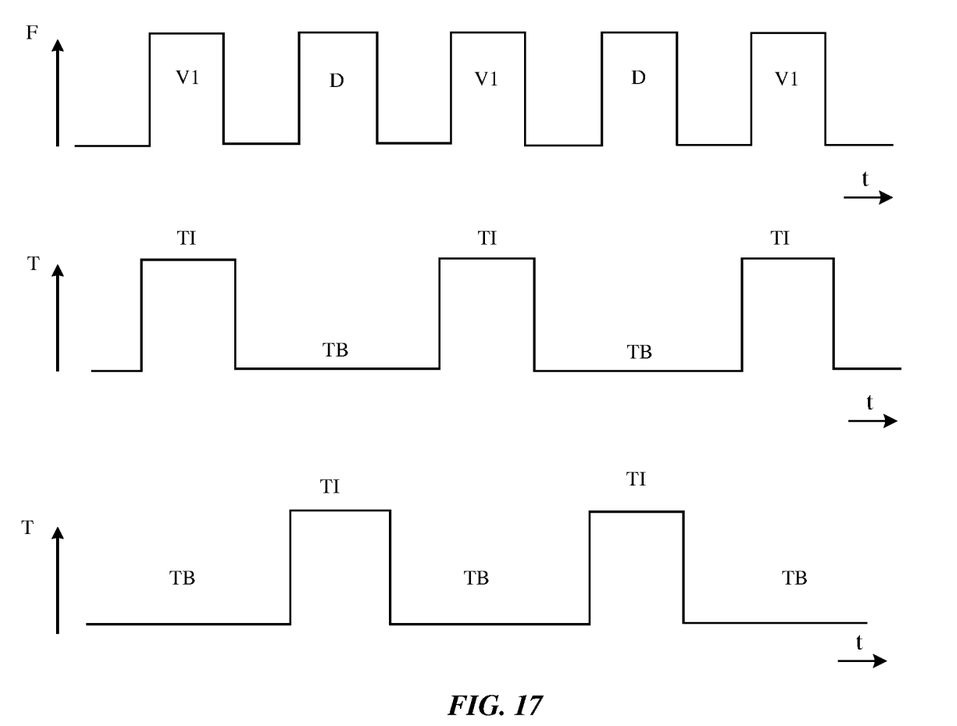
FIG. 17 is a timing diagram showing how window light-modulators and glasses may be synchronized with frames of content on a display in a system in accordance with an embodiment.

As shown in the uppermost trace of FIG. 17, control circuitry 14 may use display 18 to display image frames V1 for user 36 and interspersed dummy frames D. Glasses 24 may be modulated so that opaque intervals TB overlap dummy frames D while transparent intervals TI overlap image frames V1, as shown by the middle trace of FIG. 17. This allows the user with glasses 24 to view a movie or other content associated with image frames V1. Privacy is ensured by blocking image frames V1 from view by external viewers and by allowing dummy content to be viewed through windows 18' by external viewers. As shown in the lowermost trace of FIG. 17, for example, light modulators 70 may be directed to produce opaque intervals TB that overlap image frames V1 and transparent intervals TI that overlap dummy frames D. With this arrangement, user 36 in interior 38 may view video V1 and external observers will see dummy content D through windows 18'. This scheme may be used in environments with one user 36, two users 36, or more than two users 36. The configuration of FIG. 17 is merely illustrative.

The foregoing is merely illustrative and various modifications can be made to the described embodiments. The foregoing embodiments may be implemented individually or in any combination.

What is claimed is:

1. A system, comprising:
electronic equipment having at least one display and control circuitry that displays a series of image frames and non-viewable dummy frames on the display; and
light modulators that exhibit opaque intervals and transparent intervals, wherein the transparent intervals are synchronized with the image frames and the image frames are visible through the light modulators, wherein the opaque intervals are synchronized with the non-viewable dummy frames and prevent the non-viewable dummy frames from being visible through the light modulators.

2. The system defined in claim 1 further comprising a vehicle body, wherein the display is mounted to the vehicle body, wherein the vehicle body surrounds a vehicle interior, and wherein the light modulators are in the vehicle interior.

3. The system defined in claim 2 further comprising glasses in the interior, wherein the glasses include the light modulators and include control circuitry that is coupled to the light modulators.

4. The system defined in claim 3 wherein the electronic equipment and the glasses each include wireless communications circuitry and wherein the control circuitry in the electronic equipment and the control circuitry in the glasses use the wireless communications circuitry to synchronize the transparent intervals of the light modulators to the image frames displayed by the display.

5. The system defined in claim 4 further comprising speakers in the glasses that are configured to play wirelessly received audio associated with the image frames, wherein the display comprises one of a plurality of displays that surround the vehicle interior.

6. The system defined in claim 5 wherein the light modulators comprise liquid crystal light modulators.

7. The system defined in claim 2 further comprising a window in the vehicle body that includes the display.

8. The system defined in claim 1 further comprising:
glasses, wherein the glasses include the light modulators;
structures that surround an interior region, wherein the display and the glasses are located in the interior region;
windows in the structures that are interposed between the interior region and an exterior region; and
additional light modulators in the windows, wherein the additional light modulators have transparent intervals that overlap the non-viewable dummy frames and have opaque intervals that overlap the image frames.

9. The system defined in claim 1 wherein the image frames and the non-viewable dummy frames are displayed for equal amounts of time.

10. A vehicle system, comprising:
a vehicle body structure surrounding an interior;
a display mounted to the vehicle body structure in the interior;
control circuitry that displays first image frames, second image frames, and non-viewable dummy frames on the display;
a first pair of glasses in the interior with light modulators having transparent intervals that overlap the first image frames and opaque intervals that overlap the non-viewable dummy frames and that overlap the second image frames; and
a second pair of glasses in the interior with light modulators having transparent intervals that overlap the second image frames and having opaque intervals that overlap the first image frames and that overlap the non-viewable dummy frames.

11. The vehicle system defined in claim 10 wherein the display comprises one of a plurality of displays in the interior each of which displays the first image frames, the second image frames, and the non-viewable dummy frames.

12. The vehicle system defined in claim 11 wherein at least some of the non-viewable dummy frames are complementary images of the first image frames.

13. The vehicle system defined in claim 12 wherein at least some of the non-viewable dummy frames are complementary images of the second image frames.

14. The vehicle system defined in claim 10 further comprising:
wireless circuitry coupled to the control circuitry that transmits a first audio track associated with the first image frames to the first pair of glasses and that transmits a second audio track associated with the second image frames to the second pair of glasses.

15. The vehicle system defined in claim 14 wherein:
the first pair of glasses includes first speakers;
the first pair of glasses includes circuitry that wirelessly receives the first audio track and plays the first audio track through the first speakers;
the second pair of glasses includes second speakers; and
the second pair of glasses includes circuitry that wirelessly receives the second audio track and plays the second audio track through the second speakers.

16. The vehicle system defined in claim 10 wherein the control circuitry displays the first image frames in a first pattern of time intervals on the display and displays the second image frames in a second pattern of time intervals on the display that is different than the first pattern.

17. A system, comprising:
electronic equipment with a display and control circuitry that is configured to display a series of interspersed first image frames, second image frames, and third image frames; and first light modulators that are configured to exhibit transparent intervals that overlap the first image frames and opaque intervals that overlap the second and third image frames;

second light modulators that are configured to exhibit transparent intervals that overlap the second image frames and opaque intervals that overlap the first and third image frames; and third light modulators that are configured to exhibit transparent intervals that overlap the third image frames and opaque intervals that overlap the first and second image frames, wherein the control circuitry is configured to display non-viewable dummy frames interspersed with the first, second, and third image frames.

18. The system defined in claim 17 further comprising a window, wherein the display is a transparent display that overlaps the window.

19. The system defined in claim 17 wherein the control circuitry is configured to display the first, second, and third image frames in respective non-overlapping first, second, and third time-interval patterns.

20. The system defined in claim 17 further comprising first glasses that include the first light modulators, second glasses that include the second light modulators, and third glasses that include the third light modulators.

* * * * *